(12) United States Patent
Brokaw

(10) Patent No.: US 8,427,130 B2
(45) Date of Patent: Apr. 23, 2013

(54) METHODS AND APPARATUSES FOR COMBINED FREQUENCY COMPENSATION AND SOFT START PROCESSES

(75) Inventor: A. Paul Brokaw, Tucson, AZ (US)

(73) Assignee: Integrated Device Technology, Inc., San Jose, CA (US)

( * ) Notice: Subject to any disclaimer, the term of this patent is extended or adjusted under 35 U.S.C. 154(b) by 314 days.

(21) Appl. No.: 12/970,743

(22) Filed: Dec. 16, 2010

(65) Prior Publication Data

US 2012/0155127 A1   Jun. 21, 2012

(51) Int. Cl.
    *G05F 3/16*   (2006.01)
(52) U.S. Cl.
    USPC .......................................... 323/316; 323/901
(58) Field of Classification Search .................. 323/314, 323/315, 316, 901
    See application file for complete search history.

(56) References Cited

U.S. PATENT DOCUMENTS

| | | | |
|---|---|---|---|
| 4,806,842 A | 2/1989 | Bittner | |
| 5,612,610 A | 3/1997 | Borghi et al. | |
| 5,615,097 A | 3/1997 | Cross | |
| 5,754,419 A | 5/1998 | Ho | |
| 6,101,106 A * | 8/2000 | Shi | 363/41 |
| 6,185,082 B1 | 2/2001 | Yang | |
| 6,507,227 B2 | 1/2003 | Genova et al. | |
| 6,611,132 B2 | 8/2003 | Nakagawa et al. | |
| 6,621,256 B2 | 9/2003 | Muratov et al. | |
| 7,064,531 B1 | 6/2006 | Zinn | |
| 7,202,694 B2 | 4/2007 | Eberlein | |
| 7,208,927 B1 | 4/2007 | Nguyen | |
| 7,330,019 B1 | 2/2008 | Bennett | |
| 7,355,830 B2 | 4/2008 | Motomori | |
| 7,528,587 B2 | 5/2009 | Wu et al. | |
| 7,595,969 B2 | 9/2009 | Oba | |
| 7,609,042 B2 | 10/2009 | Kokubun et al. | |
| 7,675,757 B2 | 3/2010 | Nakamura | |
| 7,683,590 B2 | 3/2010 | Yoshida | |
| 7,710,700 B2 | 5/2010 | Young | |

* cited by examiner

*Primary Examiner* — Shawn Riley
(74) *Attorney, Agent, or Firm* — Traskbritt, PC

(57) ABSTRACT

Soft start circuits for a switching power converter include an amplifier configured to operate from a common bias node and amplify a difference between a positive input and a negative input to generate an amplifier output. A soft start bias circuit supplies a soft start bias current during a soft start process for the switching power converter. An operational bias circuit supplies an operational bias current after the soft start process. In some embodiments, a capacitor is operably coupled to the amplifier output and is configured to provide a frequency compensation for the switching power converter and a charging ramp for the soft start process. In some embodiments, the soft start circuit is configured such that the soft start bias current is at least an order of magnitude smaller than the operational bias current and limits a current that the amplifier can during the soft start process.

25 Claims, 8 Drawing Sheets

METHODS AND APPARATUSES FOR COMBINED FREQUENCY COMPENSATION AND SOFT START PROCESSES

TECHNICAL FIELD

Embodiments of the present disclosure relate generally to switching power supplies and, more particularly, to methods and apparatuses for responding to changes in current in an output of a switching power supply.

BACKGROUND

Switching power converters are often used when an input voltage needs to be converted to another voltage level. When stepping down voltages, a buck converter is often used.

FIG. 1 illustrates a block diagram of a conventional buck converter 100. FIG. 2 illustrates timing waveforms for the buck converter of FIG. 1. An error amplifier 110 compares a feedback signal from the output Vout to a reference voltage. A comparator 130 compares an output of the error amplifier 110 to an output from a sawtooth waveform generator 120. An output of the comparator 130 is used by a switching controller 140, which adjusts a duty cycle of a pulse-width-modulation signal, which controls switch SW1. The switch SW1 drives a network including an inductor L1, a diode D1 and a capacitor C1.

As shown in FIG. 2, signal 220 shows the sawtooth signal that is compared to the output of the error amplifier 110, which is indicated by signal 210. As shown, the buck converter 100 is in a stable state with the error signal 210 mostly stable; indicating the output voltage Vout matches the reference voltage Vref. The pulse-width-modulation signal 235 goes low, turning off the switch SW1, when the sawtooth signal 220 exceeds the error signal 210 as indicated by line 240. The pulse-width-modulation signal 235 goes high, turning on the switch SW1, either from a clock signal (not shown) or when the sawtooth signal 220 is lower that the error signal as indicated by line 250.

The output (not shown) of the switch SW1 will oscillate based on the pulse-width-modulation signal 235, which is then filtered by the network to create a stable voltage on the Vout signal.

In switching power converters, for example buck or boost converters, a common means of shaping the feedback loop frequency response is to use current feedback to modify the response of the duty cycle modulator. This current feedback may take the form of a measure of the instantaneous power switch current in a form that can properly modify the stabilizing slope signal. Alternatives for developing this current feedback traditionally involve multiple replica currents, which can cause additional cost, inaccuracy, a reduction in speed, and increased complexity.

Some switching power converters may also compare the switch current to a reference level and use the result to shut off the main switch when a current overload causes the switch current to exceed a level determined by the reference current. Another problem may occur when the voltage across the inductor, during the switch off time, is insufficient to allow the inductor current to ramp down as much as it ramps up during the minimum on time of a current limited cycle. If this unbalanced ramping happens and normal switching continues, inductor current may be increased somewhat at the end of each cycle and may build up to values excessively beyond normal current limiting detection. In this case, a special detection and response, other than that of normal current overload, may be needed.

In conventional switching power converters, for example a buck or a boost converter, there is often a need to provide both frequency compensation, for normal closed loop stable operation, and also to provide a soft start function. Each of these functions conventionally has been implemented using a different capacitor for each function. Loop stabilizing frequency compensation is often conventionally shaped by loading an Operational Transconductance Amplifier (OTA) with a selected driving point impedance. Frequently, this compensation is done with a single series RC network as the driving point impedance. In addition, soft start functions are often included in a switching power converter. Many conventional implemenations include a switch to preset the voltage to result in the minimum duty ratio. The voltage is then made to rise slowly so as to cause the duty ratio to change slowly and gradually bring the converter ouput to the normal controlled level.

There is a need for methods and apparatuses for switching power conversion that provide a simplified process and circuit that combines features of frequency compensation and a soft start output process.

BRIEF SUMMARY OF THE INVENTION

Embodiments discussed herein may be used in switching power conversion to provide a simplified process and circuit that combines features of frequency compensation and a soft start output process.

In one embodiment of the invention, a soft start circuit for a switching power converter includes an amplifier configured to operate from a common bias node and amplify a difference between a non-inverting input signal and an inverting input signal to generate an amplifier output. A soft start bias circuit is operably coupled to the common bias node and is configured to supply a soft start bias current during a soft start process for the switching power converter. An operational bias circuit is operably coupled to the common bias node and is configured to supply an operational bias current after the soft start process. A capacitor is operably coupled to the amplifier output and is configured to provide a frequency compensation for the switching power converter and a charging ramp for the soft start process.

In another embodiment of the invention, a soft start circuit for a switching power converter includes an amplifier configured to operate from a common bias node and amplify a difference between a non-inverting input signal and an inverting input signal to generate an amplifier output. A soft start bias circuit is operably coupled to the common bias node and is configured to supply a soft start bias current during a soft start process for the switching power converter. An operational bias circuit is operably coupled to the common bias node and is configured to supply an operational bias current after the soft start process. The soft start circuit is configured such that the soft start bias current is at least an order of magnitude smaller than the operational bias current and substantially limits a current that the amplifier can produce on the amplifier output during the soft start process.

Yet another embodiment of the invention is a method of operating a switching power converter that includes producing a soft start bias current for a common bias node during a soft start process and producing an operational bias current for the common bias node after the soft start process. The soft start bias current and the operational bias current are combined on the common bias node. A combined bias current from the common bias node is supplied to an amplifier to amplify a difference between a non-inverting input signal and an inverting input signal on an amplifier output. A capacitor is charged with the amplifier output during the soft start process and the capacitor provides frequency compensation for the switching power converter after the soft start process.

Yet another embodiment of the invention is a method of operating a switching power converter that includes producing a soft start bias current for a common bias node during a soft start process and producing an operational bias current for the common bias node after the soft start process. The soft start bias current and the operational bias current are combined on the common bias node. A combined bias current from the common bias node is supplied to an amplifier to amplify a difference between a non-inverting input signal and an inverting input signal on an amplifier output. In this method, the soft start bias current is at least an order of magnitude smaller than the operational bias current and substantially limits a current that the amplifier can produce on the amplifier output during the soft start process.

DETAILED DESCRIPTION

Figure 1:
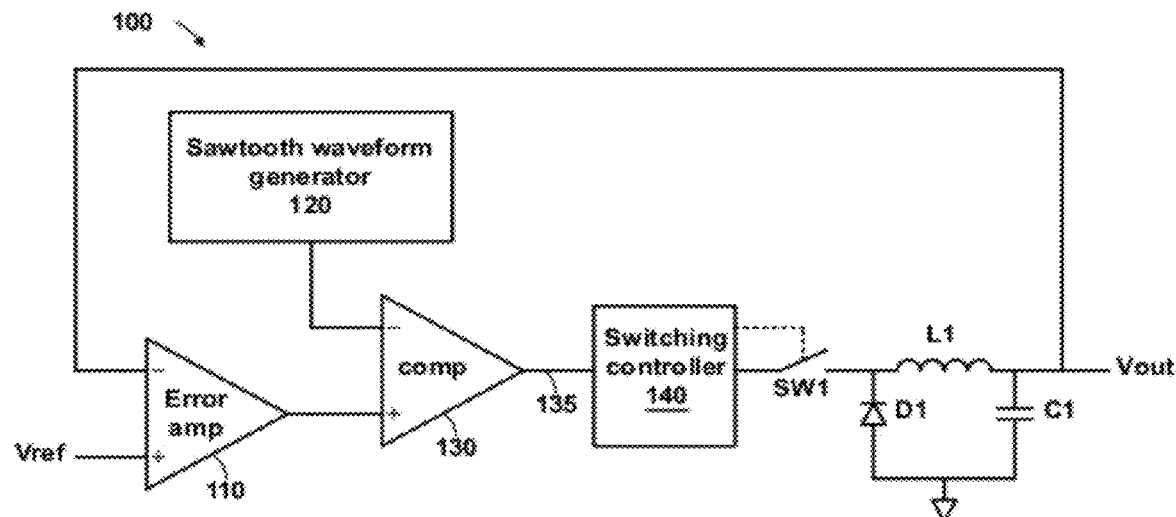
FIG. 1 illustrates a block diagram of a conventional buck converter.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

The terms "assert" and "negate" may be respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

Those of skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

When describing circuit elements, such as, for example, resistors, capacitors, and transistors, designators for the circuit elements begin with an element type designator (e.g., R, C, M) followed by a numeric indicator. Circuit element numbers may be repeated on different drawings and are not to be considered the same element unless expressly indicated as such. In other words, a capacitor C1 on FIG. 1 is a different element from a capacitor C1 on FIG. 6. Power sources such as, for example VDD and VCC as well as ground voltages may be generically indicated. When appropriate, these power signals may be described in detail. In other cases, the power signals may not be described as it would be apparent to a person of ordinary skill in the art which power signal should be used. As a non-limiting example, it may be appropriate to maintain separate analog and digital grounds and a person of ordinary skill in the art would understand which is the appropriate ground for a specific circuit.

Embodiments discussed herein may be used in switching power conversion to provide a simplified process and circuit that combines features of frequency compensation and a soft start output process.

As will be discussed in detail, a replica of a main switch current is derived from small transistors operated at the same terminal voltages as the main switch. This replica current is used to drive a resistor, and the resulting voltage signal is used to augment a compensating ramp voltage, which achieves current feedback. A reference current drives a second resistor to a reference voltage level, which is compared to the voltage level made by the replica current. When the replica voltage exceeds the reference voltage, an overload condition is determined and the main switch is turned off for the remainder of the cycle. The reference current resistor has a switchable series component, which allows the reference derived voltage to be increased to detect a super-overload condition. When super-overload is detected, the main switch is held off for as many cycles as is necessary to return a main inductor current to a predetermined value, such as, for example, at or near zero, before the main switch is allowed to come back on.

Figure 3:
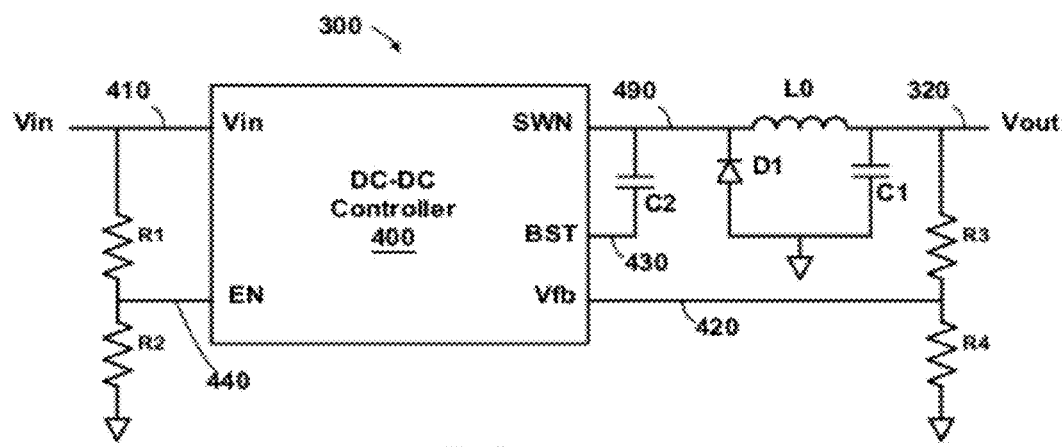
FIG. 3 illustrates a switching power converter according to one or more embodiments of the present invention.

FIG. 3 illustrates a switching power converter 300 according to one or more embodiments of the present invention. A DC-DC controller 400 (also referred to herein as a controller for a switching power converter 400) includes a main switch that generates the SWN output 490 from a voltage input Vin 410. As discussed above the SWN output 490 is filtered by a network including a main diode D1, a main inductor L0, and a main capacitor C1. The filtered output Vout 320 is fed back to the DC-DC controller 400 via the Vfb input 420.

In some embodiments, the DC-DC controller 400 portion of the switching power converter 300 may be configured as a monolithic integrated circuit with external components to complete the functions for the switching power converter 300.

In some embodiments, an external voltage divider including resistors R3 and R4 may be used to generate an attenuated version of Vout 320 to be used as a voltage feedback Vfb 420 to close a main feedback control loop. In other embodiments, an internal programmable block may be used to attenuate the output voltage Vout 320. Still other embodiments may use a combination of external and internal attenuation.

A voltage divider including resistors R1 and R2 creates a scaled-down version of the Vin signal 410 as an enable (EN) signal 440 to determine whether a soft start operation should be started based on a comparison of the EN signal 440 to an internal threshold, as is explained below.

A pump capacitor C2 is coupled between the SWN signal 490 and a boosted voltage input BST 430. The BST voltage input 430 may be selectively coupled to the main switch and the replica switch. In one embodiment, the capacitor C2 may be sized so as to be able to supply the main switch turn-on charge with a negligible droop. As a non-limiting example, the BST voltage input 430 may provide a boosted voltage that is about 5 volts above the SWN signal 490.

Figure 4:
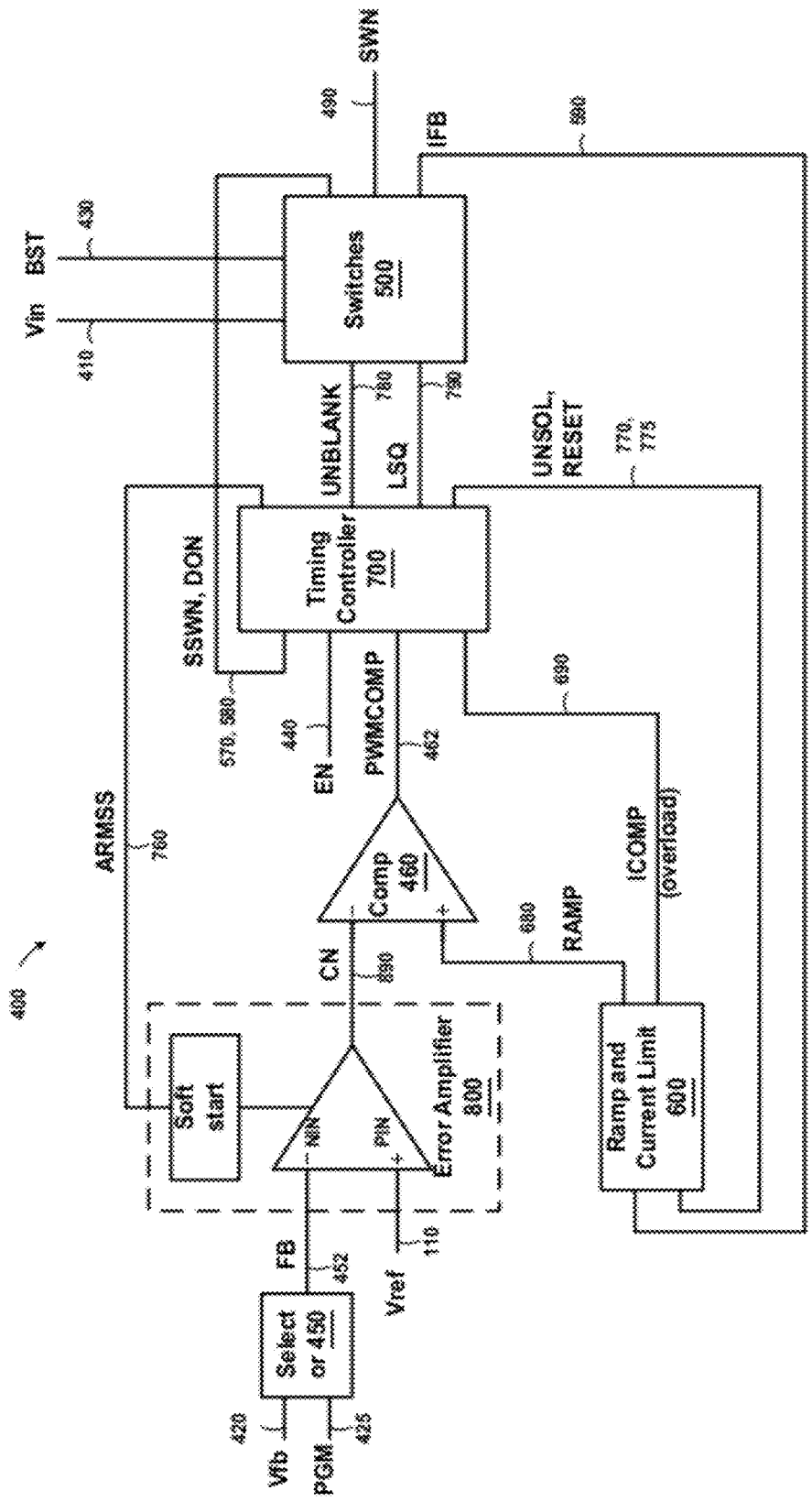
FIG. 4 illustrates a block diagram of a DC-DC converter according to one or more embodiments of the present invention.

FIG. 4 illustrates a block diagram of the DC-DC converter 400 according to one or more embodiments of the present invention. A switches block 500 receives the Vin voltage 410 and the BST voltage 430 for the main switch and replica switch in response to control signals UNBLANK 780 and LSQ 790. The switches block generates the SWN signal 490 to drive the external filter network and also generates a current feedback signal IFB 590, which is a low current replica of the current delivered from the main switch on the SWN signal 490. The switches block 500 also generates status and control signals SSWN 570 Diode on (DON) 580. The SSWN signal 570 is an internal digital signal that includes timing similar that of the SWN signal 490. The DON signal 580 is asserted when the main diode D1 (FIG. 3) is conducting (i.e., in a free-wheeling mode).

A ramp and current limit block 600 uses the IFB signal 590 along with control signals UNSOL 770 and RESET 775. The ramp and current limit block 600 generates a compensation ramp with current feedback superimposed, and also performs current limit detection, as explained below. An ICOMP signal 690 indicates an overload condition and is used by a timing controller 700. A RAMP signal 680 carrying the augmented compensation ramp feeds one input of a comparator 460.

Figure 2:
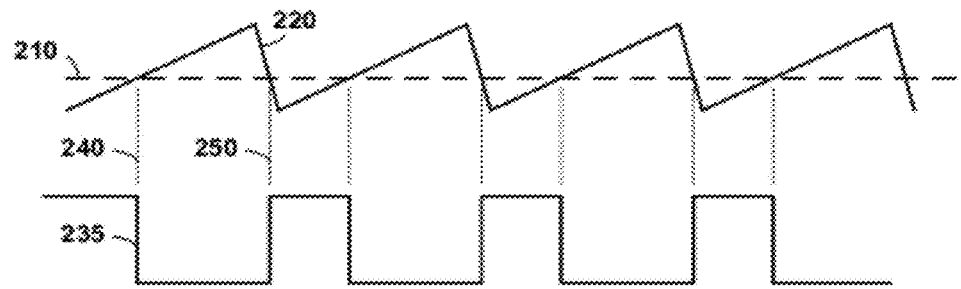
FIG. 2 illustrates timing waveforms for the buck converter of FIG. 1.

The comparator 460 compares the RAMP signal 680 and a feedback difference signal 890 (also referred to herein as a Compensation Node (CN) signal 890) from the output of an error amplifier 800. The comparator may be, for example, a simple differential stage driving an output device through a folded mirror. The output of the comparator 460 is a pulse-width-modulation comparison (PWMCOMP) signal 462, which is similar to the signal discussed above with reference to FIG. 2, except that for embodiments of the present invention, the PWMCOMP signal 462 may include alterations to the duty cycle due to current feedback.

The error amplifier 800 amplifies a difference between a voltage reference Vref 110 and a feedback voltage FB 452. The error amplifier 800 may also include a soft start function that is controlled by an arm soft start (ARMSS) signal 760.

The timing controller 700 uses the PWMCOMP 462 signal along with control signals ICOMP 690, EN 440, SSWN 570, and DON 580, to determine timing for control of the main switch and the replica switch as control signals UNBLANK 780 and LSQ 790.

A selector block 450 includes programmable voltage dividers to reduce the voltage that is input on the Vfb signal 420 to a suitable voltage on the FB signal 452 based on overall feedback loop parameters, the voltage on Vout 320 (FIG. 3) and any external attenuation if present, as explained above.

As a non-limiting example, the PGM input 425 may include 3 bits to select up to eight different voltages on the FB signal 452 that are proportional to the Vfb signal 420.

Figure 5:
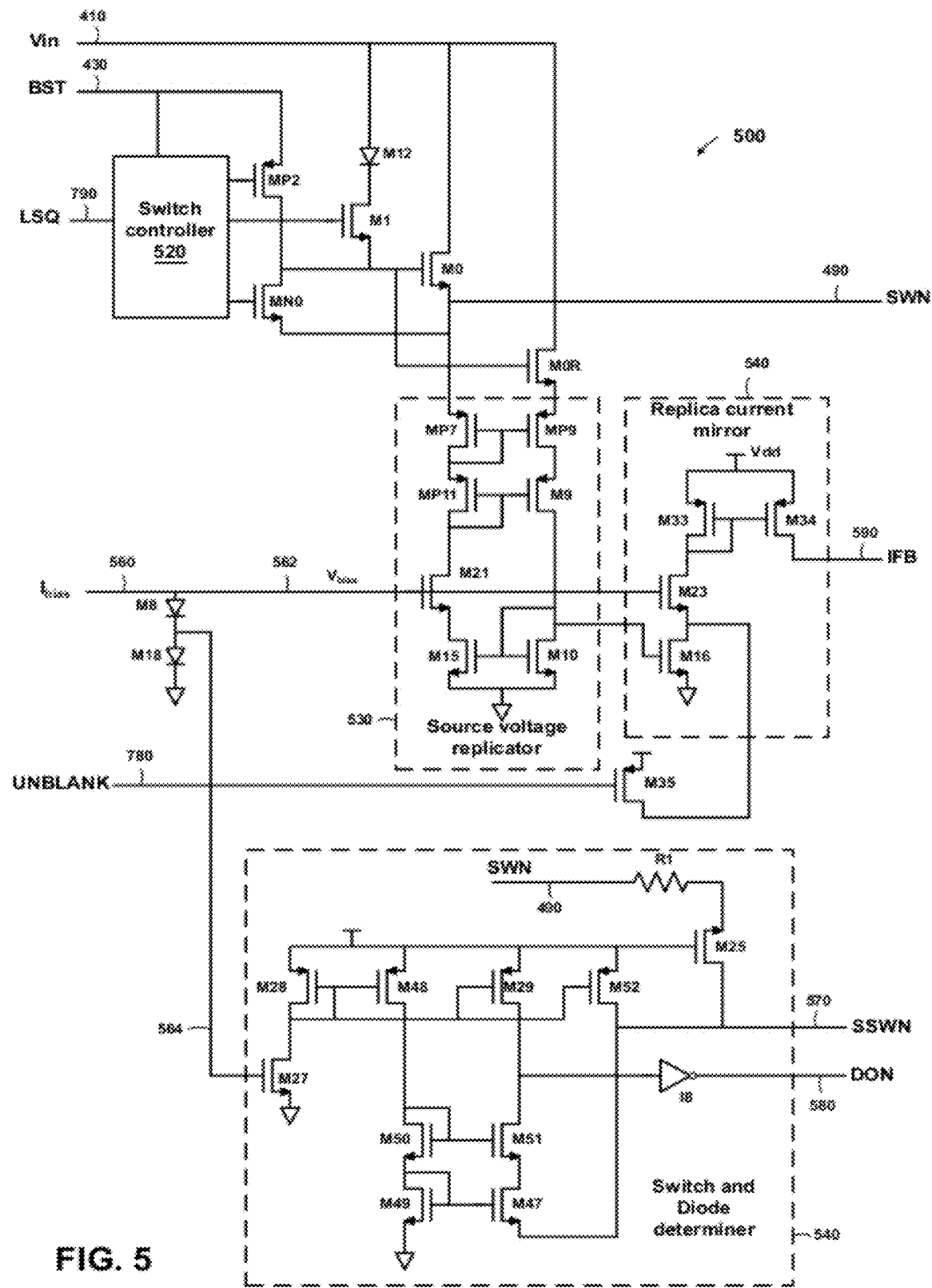
FIG. 5 illustrates a circuit diagram of a current switch, a replica current switch and supporting circuitry according to one or more embodiments of the present invention.

FIG. 5 illustrates a circuit diagram of a current switch M0 (also referred to herein as main switch M0 and transistor M0), a replica current switch M0R and supporting circuitry according to one or more embodiments of the present invention.

In one embodiment, the main switch M0 may be configured as an N-channel Metal Oxide Semiconductor (NMOS) transistor for switching the main input voltage Vin 410 to the SWN signal 490 for driving the external inductor L0 (FIG. 3). In this example embodiment, the main switch M0 may be configured to support a current of about 3 A.

The boost voltage BST 430 may be configured to provide a voltage about 5 V above the SWN signal 490.

A switch controller 520 uses the LSQ signal 790 as an input to determine when to turn the main switch M0 on and off. The switch controller 520 controls transistors MP2, MN0, and M1 to control the main switch M0.

To minimize the charge taken from the BST voltage 430, which must be restored cycle-by-cycle, the NMOS transistor M1 is driven to connect the gate of the main switch M0 to the Vin voltage 410 during the part of the switching cycle where the gate voltage of M0 is below the Vin voltage 410. As the voltage on the gate of transistor M0 reaches the Vin voltage 410, M1 is disconnected by M12, (configured and shown as a bipolar diode), to allow the gate of transistor M0 to be pulled more positive by transistor MP2, which brings the gate of transistor M0 to near the BST voltage 430.

Figure 7:
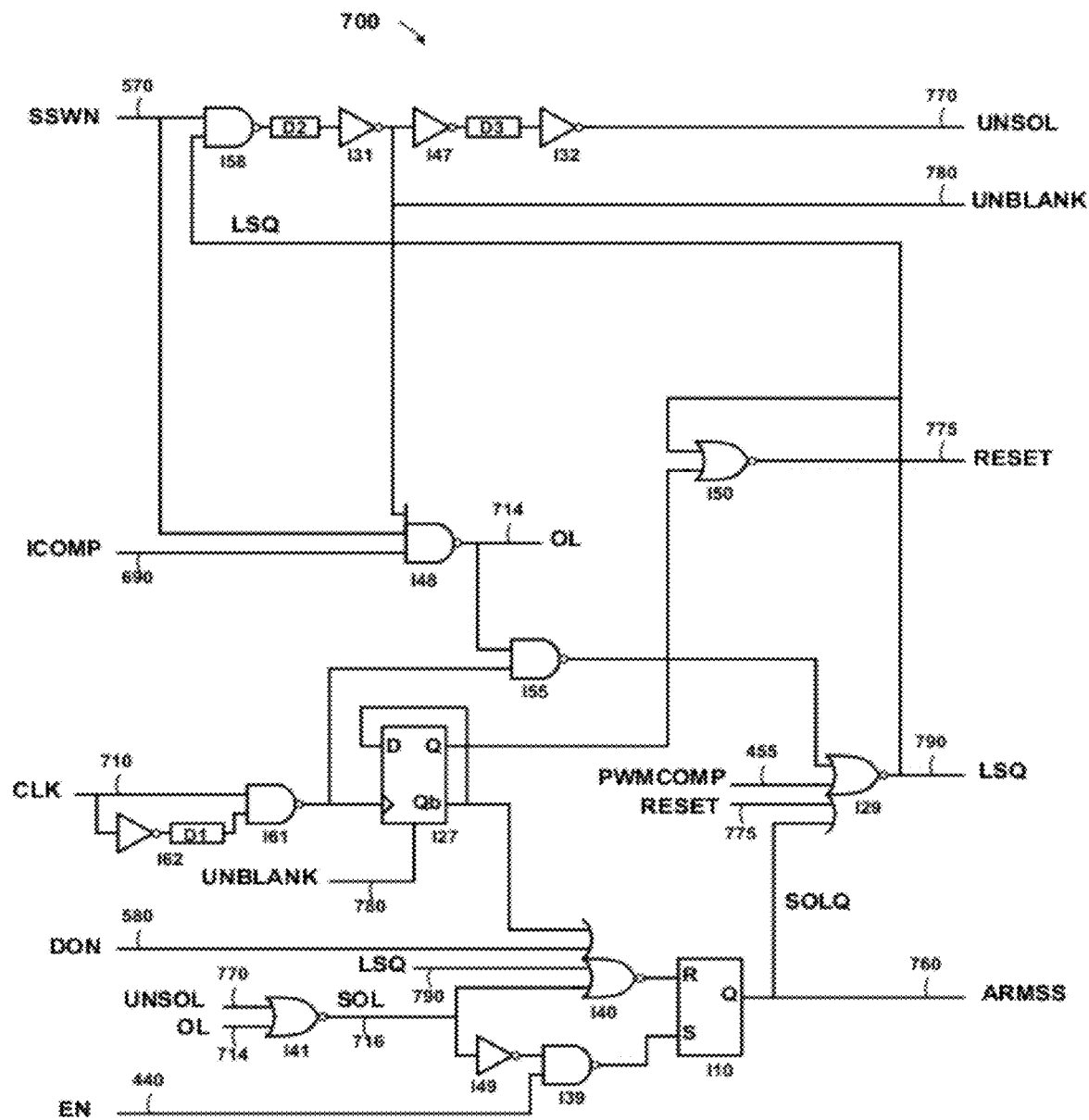
FIG. 7 illustrates a circuit diagram of timing and control logic for the DC-DC converter of FIG. 4.

Drive to the gate of the main switch M0 is initiated by the LSQ signal 790 from the timing controller 700 (FIG. 7). The switch controller 520 uses the LSQ signal 790 to create gate controls for transistors MP2, M1, and MN0 with appropriate timing to turn the main switch M0 on and off while minimizing current spikes through the main switch M0.

When the LSQ signal 790 is low, transistors MP2 and M1 are held off by their respective gate controls from the switch controller 520. Transistor MN0 is turned on by its gate control from the switch controller 520. With transistors MP2 and M1 off and transistor MN0 on, transistor MN0 connects the gate and source of the main switch M0 together, thereby turning off the main switch M0.

When LSQ goes high, transistor MN0 is turned off, releasing the gate of the main switch M0 so it can be driven high by voltage at the source of transistor M1, which is also turned on when LSQ goes high. Since the drain of transistor M1 is connected through a diode M12 to the Vin voltage 410, transistor M1 is prevented from clamping the gate of the main switch M0 to the Vin voltage 410.

As the BST voltage 430 exceeds the Vin voltage 410, the switch controller 520 turns on transistor MP2, which clamps the gate of the main switch M0 at the BST voltage 430.

At the end of the on-time for the main switch M0, which is determined by the overall feedback loop, LSQ goes low and transistors M1 and MP2 are turned off and transistor MN0 is turned on, restoring the off state for the main switch M0, as discussed above.

Transistor M0R is configured to produce a scaled down replica of the current through the main switch M0. The gate of replica transistor M0R is connected to the gate of the main switch M0. In addition, the drain of the replica transistor M0R is connected to the drain of the main switch M0. While illustrated as n-channel transistors in FIG. 5, those of ordinary skill in the art will recognize the main switch M0 and replica transistor M0R may be configured as p-channel transistors with possible minor changes to the various control signals of the switches block 500.

A source voltage replicator 530 operates to keep the voltages at the sources of the main switch M0 and the replica switch M0R at substantially the same level. When the main switch M0 is on, the gate drive, which is shared by the replica transistor M0R, causes the source of the replica transistor M0R to try to go positive (i.e., to the voltage set by the drain of the replica transistor M0R). This current pulls up on transistor MP9, which is part of a common gate differential stage including in addition, transistors M9, MP7, and MP11. The current drawn by the replica transistor M0R is sent through transistors MP9 and M9 to a biased current mirror including transistors M10 and M15, and biased transistor M21. Thus, the current through the replica transistor M0R is reflected back to transistor MP7 by way of transistor MP11. This current mirroring forces both transistor MP7 and MP9 to operate at the current in the replica transistor M0R, and since the two transistors are configured to be closely matched and share a common gate voltage, their source voltages should match, as well. As a result, all three signal terminals of the replica transistor M0R are at the same voltages as the corresponding terminals of the main switch M0. With the same voltages at all three terminals, the replica current should track the main switch current in a ratio determined by their relative sizes.

A minimum width replica device may operate at an inconveniently high current. As a result, in addition to scaling gate widths between the main switch M0 and the replica switch M0R, gate lengths may also be adjusted. In addition, since the device lengths may not be scalable, series connecting devices may be used. In one non-limiting example, the replica current is maintained very small (e.g., in the microamp range) by configuring the replica transistor M0R as multiple (.e.g., 6) NMOS transistors connected in series with common gate connections. The drain of the transistor at the top of the series stack is connected to the drain of the main switch M0 and the source of the transistor at the bottom of the series stack is connected to transistor MP9.

A replica current mirror 540 connects to the source voltage replicator 530 via transistor M16 configured to mirror the current through transistor M10. Transistor M23 is in a cascode configuration with transistor M16 and biased with the same voltage bias $V_{bias}$ 562 as transistor M21. Thus a current similar to that through the replica transistor M0R is delivered to a current mirror including transistors M33 and M34. This current mirror inverts the polarity of the replica current and allows the voltage to comply with an internal VDD voltage. The inverted replica current is sent out of the switches block 500 to the ramp and current limit block 600 as a replica current that is proportional to the main current and can thus be considered a feedback current IFB 590.

In addition, transistor M35 is arranged to divert the current from transistor M16 controlled by the NMOS mirror (transistors M10 and m15), so as to make the current on the IFB signal 590 zero when the UNBLANK signal 780 is low. This permits a blanking process during an initial period when the main switch M0 is first turned on at each cycle. The main switch may produce a large charging current over and above the actual current through the main inductor L0. With the UNBLANK signal 780 control of transistor M35, this charging artifact can be suppressed from the IFB signal 590.

A bias current $I_{bias}$ 560 passes through diodes M8 and M18, which may be configured as diode connected MOS transistors. The voltage drop of the two diodes provides the bias voltage $V_{bias}$ 562 for the gates of cascode transistors M21 and M23.

In addition, another bias voltage 564 controls transistor M27 in a switch and diode determiner 540. The current from transistor M27 serves to bias a circuit that detects when the main inductor L0 (FIG. 3) is driving current into the free-wheeling diode D1 (FIG. 3). Transistor M27 current biases diode connected transistor M28, which then mirrors its current to transistors M52, M29, and M48. Transistor M52 provides a pull-up current for the SSWN signal 570, which is an internal signal that follows the SWN signal 490 sent to the main inductor L0. Transistors M29 and M48 provide equal bias currents for the two sides of a common base differential amplifier including transistors M49, M50, M51, and M47. The differential amplifier is ground referenced so that when the SSWN signal 490 is pulled high, the drain of transistor M51 will be pulled high by transistor M29, causing the DON signal 580 at the output of inverter 18 to go low indicating that the main diode D1 is not conducting.

However, when the SWN signal 490 goes low, it will turn on transistor M25 connected to the SSWN signal 490 and will pull the SSWN signal 570 low. Resistor R1 limits the current that may flow when the SSWN signal 570 may be driven below ground. Normally, at the end of a switch-on time the main inductor L0 will drive the SWN signal 490 negative until it turns on the free-wheeling diode D1 (i.e., the main diode). This negative voltage biases transistor M47 to pull current from transistor M51 to sink current from transistor M29 and pull the input of inverter I8 low. The low causes the DON signal 580 to go high, indicating that the free-wheeling diode D1 is conducting. The width of transistor M47 may be configured slightly less than that of transistor M49. This width difference slightly offsets the input voltage to drive the inverter I8, so that when the SSWN signal 570 is at or near zero, the DON signal 580 will be made low. However, the offset may be configured small enough to insure that the DON signal goes high when the main inductor L0 is driving the free-wheeling diode D1 into conduction and negative relative to ground.

Figure 6:
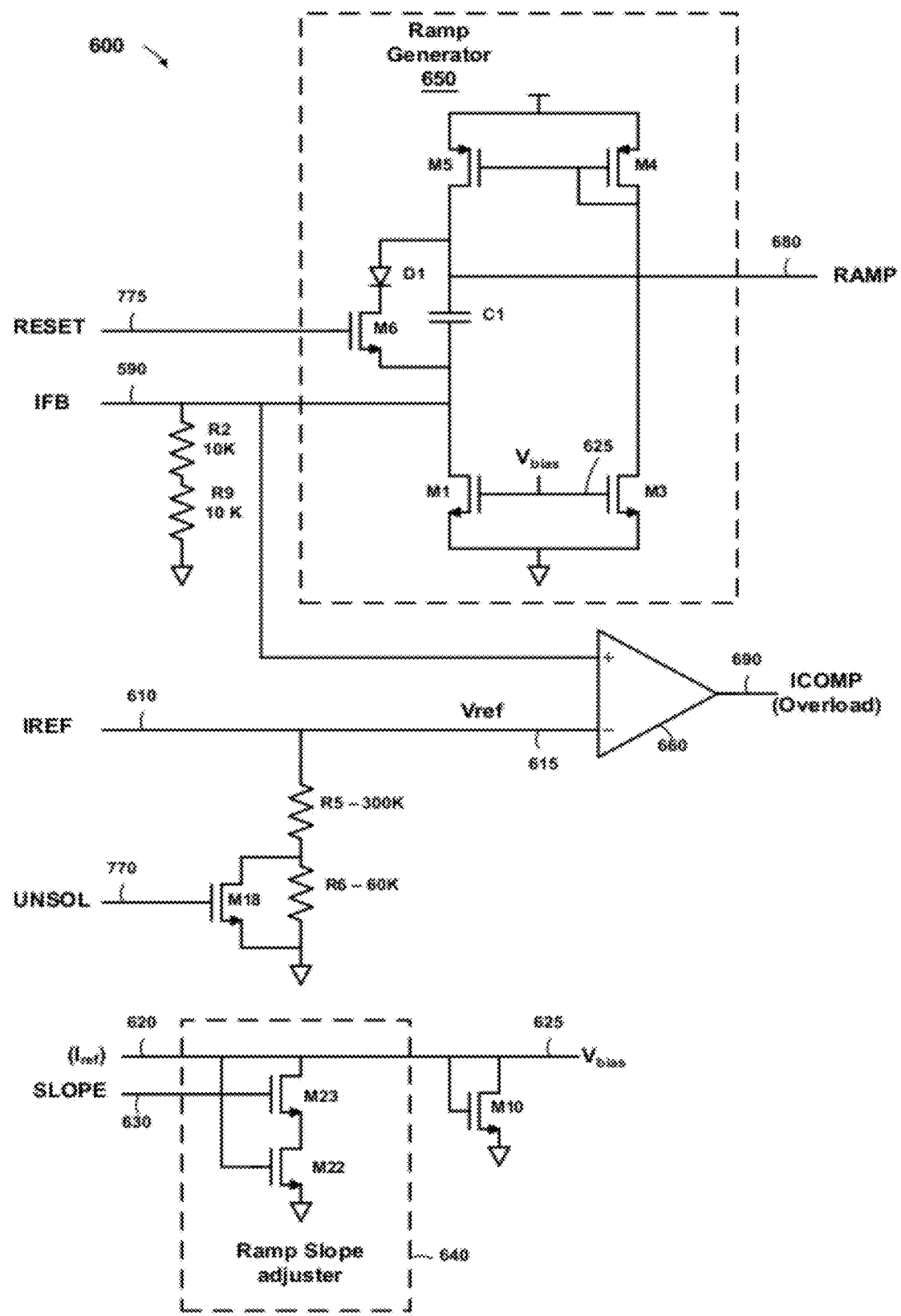
FIG. 6 illustrates a circuit diagram of a ramp generator, an overload comparator, and supporting circuitry according to one or more embodiments of the present invention.

FIG. 6 illustrates the ramp and current limit block 600 as a circuit diagram of a ramp generator 650, an overload comparator 660, and supporting circuitry according to one or more embodiments of the present invention. The ramp generator 650 generates the compensating ramp and combines it with a current feedback signal IFB 590.

The same current feedback signal 590 is also compared to a voltage reference Vref 615 to generate the ICOMP signal 690 if the voltage reference 615 is exceeded. The voltage reference may have two values, one value set to trigger at a normal current limit (e.g., about 3 A for one embodiment), and the other value set to trigger at a super overload current limit (e.g., about 3.6 A for the same embodiment).

Current limit sensing may turn off the main switch M0 (FIG. 5) and the current in the external inductor I0 (FIG. 3) is expected to drop below the trip point of comparator 660 by the start of the next cycle. Current through the external inductor I0 (as represented by the IFB signal 590) may again rise to exceed the limit, and again the main switch M0 is turned off earlier than normal and the current through inductor I0 falls below the limit. This condition can continue indefinitely, for example when the switching power converter 300 is overloaded.

Another type of overload condition can arise when, in the example case of a buck converter, the output voltage is very low. This could be at startup or when the output is short circuited. In this case, the inductor current will not decay very much when the main switch M0 is off during most of a cycle. At the beginning of the next cycle the current will ramp up, and by the time over-current is detected and the main switch M0 is shut off, the current may rise to a value higher than when it turned off at the last cycle. If the low output voltage persists the inductor current may pump up to very large values when the main switch M0 continues to be turned on at the start of each cycle.

A timer that starts when the main switch M0 turns on controls the duration of a high limit threshold comparison for a short time (i.e., an initial time period) at the beginning of the period when the main switch M0 is on. Whenever an overload is detected, circuitry is activated to turn off the main switch M0. A second section of control circuitry determines whether the overload occurred at the beginning of the cycle during the initial time period, when the high limit threshold was active, or later when the normal overload threshold was active. If the overload comparator output occurs before the timer times out, a super-overload condition exists and the switch will be turned off as in a normal overload, but in addition, the next and subsequent clock signals are blocked from turning on the switch. This condition will persist until other circuits determine that the inductor current in the main inductor L0 (FIG. 3) has decayed to a predetermined current level (e.g., at or near zero). At this point, it may be safe to turn on the main switch M0 and allow current to build up cycle by cycle until it reaches normal operation, normal overload operation, or again detects super-overload and blocks operation until the inductor current again falls to the predetermined voltage level.

A super-overload condition may arise if the output is, for example, shorted to ground. In this case, a delay in current sensing may allow the inductor current to rise well beyond the normal over current range. As a non-limiting example, if the load voltage for the switching power converter 300 is small or zero, the current in the inductor L0 may not ramp down sufficiently to fall below the normal current limit, the detection of which may again be delayed. This can allow the current in inductor L0 to increase, cycle by cycle, to possibly dangerous levels.

To avoid this problem, the super-overload (SOL) condition is sensed and dealt with in a different fashion. In one embodiment, when the UNSOL signal 770 is asserted, transistor M18 turns on and bypasses resistor R6, so the bottom of resistor R5 is approximately connected to ground. In one embodiment, a reference grade current IREF 610 sets the voltage across resistor R5 to about 3V. The replica current derived by the switches block 500, drives the IFB signal 590 and flows in resistor R2 and resistor R9 to make a voltage proportional to the current in the main switch M0. In one embodiment, resistors R2 and R9 are selected to develop about 3V when the switch current is about 3 A and the replica current (which is proportional to the switch current) is about 150 uA. A simple comparator 660 detects this condition and signals an overload at the ICOMP signal 690.

Another bias current $I_{ref}$ 620 sets the gate voltage of diode connected transistor M10. This voltage $V_{bias}$ 625 is used to bias the ramp generator 650. $V_{bias}$ 625 biases transistors M1 and M3 to approximately equal currents and transistor M3 drives a current mirror including transistors M4 and M5 so that the current through transistor M5 should be near or equal to the current through transistor M1.

When transistor M6 is on, during the time the RESET signal 775 is high, it connects transistor M5 to transistor M1 through diode D1 (which may be configured as a diode connected transistor) and discharges the capacitor C1 to the voltage across diode D1. Since the current through transistor M5 is made to equal the current through transistor M1, there should be no remaining current to flow in the line from the drain of transistor M1 drain to the top of resistor R2.

During the reset interval while the RESET signal 775 is high, both the main switch current and replica current should be zero so the top of resistor R2 should be close to the ground potential. This condition puts the RAMP signal 680 at its lowest voltage, just slightly larger than the diode drop of D1.

As the main switch M0 is being turned on, the reset interval ends and transistor M6 is turned off. Now the current flow from transistor M5 to transistor M1 must pass through the capacitor C1, and cause the voltage on capacitor C1 to rise in a substantially linear fashion. Since the bottom of the capacitor C1 connects to resistor R2 at ~0 volts, this voltage across capacitor C1 will appear as a substantially linear ramp at the RAMP signal 680. Once the blanking time is over the replica current will be applied to the IFB signal 590 causing a voltage jump at the drain of transistor M1 and an additional ramp component to be added to the RAMP signal 680.

This additional ramp component is the current feedback, which generates a current compensated ramp signal to be compared to the output of the error amplifier designated as a Compensation Node (CN) signal 890 (FIG. 4).

In one embodiment, the switching power converter 300 may operate at a selected one of two frequencies (e.g., 0.6 MHz and 1.2 MHz). The description above follows the 1.2 MHZ choice. A ramp slope adjuster 640 may be included. As a non-limiting example, if the clock frequency is halved the slope of the compensating ramp can be halved by asserting the SLOPE signal 630 to turn on transistor M23. When transistor M23 is on, it completes a diode connection of transistor M22 in parallel with transistor M10. Doubling the effective size of the mirror diode reduces the gate voltage so that all the mirror outputs are halved. The ramp generator 650 operates as described above, but with about half the slope of the ramp on the RAMP signal 680 due to the current through transistors M5 and M1. While not explicitly discussed, other frequencies and operating points may be used and the ramp generator 650 may be configured to modify $V_{bias}$ 625 to additional values to adjust the slope of the ramp on the RAMP signal 680. As another non-limiting example, there may be three different choices for frequencies, and at a different top frequency that may be equally spaced (e.g., 0.6 MHz, 1.2 MHz, and 1.8 MHz) or may have a binary spacing (e.g., 0.45 MHZ, 0.9 MHz, and 1.8 MHz).

Resistors R2, R9, R5, and R6 are shown with example values based on the example discussed above to make the threshold comparison for the super-overload condition about 20% higher than the threshold comparison for the normal overload condition. In other embodiments, resistors R2, R9, R5, and R6 may be adjusted to develop different threshold ratios. Moreover, by including a resistor stack (i.e., R5 and R6) to generate the voltage reference Vref 615 and a resistor stack (i.e., R2 and R9) to generate a voltage proportional to the current feedback signal IFB 590 on the same integrated circuit, the current comparisons therebetween may maintain their accuracy even with variations caused by the temperature coefficients of the various resistors.

FIG. 7 illustrates a circuit diagram of a timing and control logic for the DC-DC converter of FIG. 4. The timing controller 700 manages the sequencing, timing, and control of the various functions of the DC-DC converter.

For ease of description, begin by assuming certain states of a few signals. A clock signal 710 (CLK) is assumed to be low before the start of a switch on cycle. The clock input 710 is inverted by inverter I62 (which may be delayed by a delay element D1) and those two signals are applied to the inputs of NAND gate I61. When the clock rises the inputs to NAND gate I61 will both be high for a short period based on a delay D1, such as from an R-C network. During this overlap time, the low pulse output of NAND gate I61 propagates to an input of NAND gate I55, causing the output of NAND gate I55 to go high. The high on the output of NAND gate I55 causes the output of NOR gate I29 to go low. The NOR gate I29 output is the LSQ signal 790. When LSQ 790 is low, the main switch M0 (FIG. 5) is driven off. Thus, the rising edge of the clock signal 710 first insures the main switch M0 is off.

This low pulse condition on the output of NAND gate I61 persists for at least enough time for the delay time through D1 to end the low pulse at the output of NAND gate I61. That low-pulse interval sets a minimum off time for the main switch M0 via NAND gate I55. As the output of NAND gate I61 goes high, the output of NAND gate I55 goes low enabling NOR gate I29 to be controlled from another input. Additionally, the positive-going trailing edge of the low pulse will trigger the toggle connected D flip-flop I27. Assuming the Q output of D flip-flop I27 to have been low, it will go high and cause an input of NOR gate I50 to go high, causing the output of NOR gate I50 to go low. This low on the RESET signal 775 ends the pulse on the RESET signal 775, which is used to discharge capacitor C1 in the ramp and current limit controller 600 (FIG. 6), as discussed above.

The RESET signal 775 also drives an input of NOR gate I29. If, as explained below, the remaining inputs of NOR gate I29 are low, LSQ 790 will go high signaling the main switch M0 to turn on.

The SSWN signal 570 from the switches block 500 indicates that the main switch M0 is on and when combined with LSQ 790 by NAND gate I58 drives a second delay D2. After a short delay from D2, inverter I31 will switch high at its output to generate the UNBLANK signal 780. This short delay is a replica current blanking time.

The UNBLANK signal 780 also drives an input of NAND gate I48, another input of which will be positive due to the SSWN signal 570. The third input to NAND gate I48 is the ICOMP signal 690 from the current limit comparator 660 (FIG. 6). If the ICOMP signal 690 goes high, indicating an overload condition, the output of NAND gate I48 (OL 714) will go low, and propagate through NAND gate I55 as a high to an input of NOR gate I29, causing the output of NOR gate I29 to go low, and subsequently turn off the main switch M0 via the LSQ signal 790. Thus, when an overload condition is indicated by the assertion of the ICOMP signal 690, the main switch M0 is turned off earlier than it normally would have been turned off.

Figure 8:
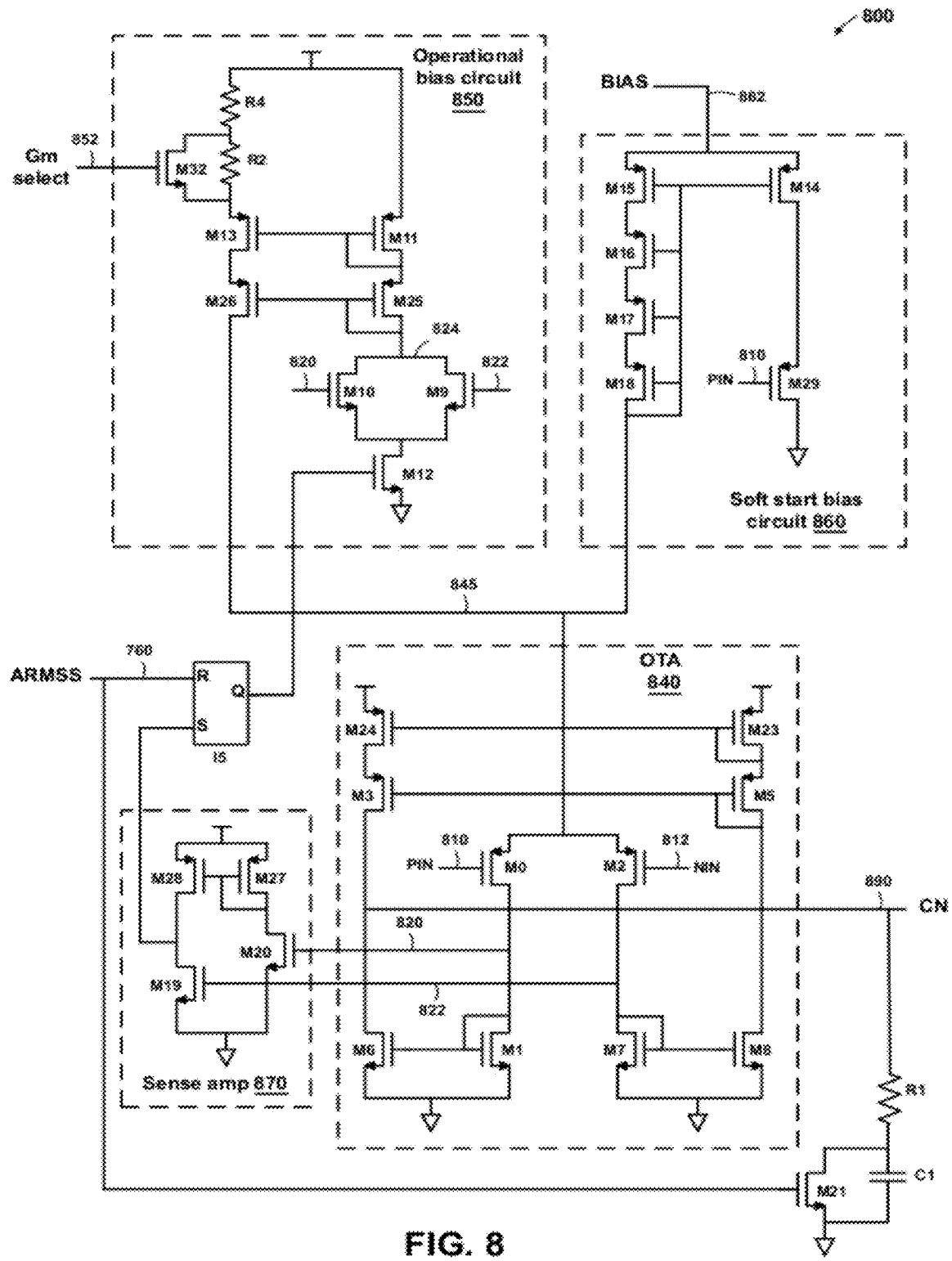
FIG. 8 illustrates a circuit diagram of an error amplifier, soft start control, and supporting circuitry according to one or more embodiments of the present invention.

The output of NAND gate I48 may also propagate through NOR gate I41, to drive a super-overload signal (SOL) 716 then inverter I49, and NAND gate I39 to set R-S flip-flop I10. The Q output of this flop indicates a super overload condition (SOLQ) and drives an input of NAND gate I29. As long as SOLQ remains high, the LSQ signal 790 will remain low and the main switch M0 will be maintained in an off state. The Q output of R-S flop I10 also goes out as an arm soft start (ARMSS) signal 760 to soft start circuitry in the error amplifier block 800 (FIG. 8). As discussed below, the ARMSS signal 760 will initially set the output voltage of the error amplifier at or near zero volts and put the error amplifier in a low bias soft start mode.

Another possibility is that the current limit may not be triggered at this time. There is a third delay section D3, between inverters I47 and I32. This circuit adds to the delay for the UNBLANK signal 780, and then goes high to make the UNSOL signal 770, which, when asserted, indicates a stop to a time period for super-overload testing. The UNSOL signal drives NOR gate I41 and blocks the OL signal 714 path to the set input of the R-S flop I10. However, it does not block the current limit path that turns off LSQ 790.

When the UNSOL signal 770 is low it turns off transistor M18 in the ramp and current limit block 600 (FIG. 6), and raises the current limit threshold voltage as discussed above. As a result, in the interval between assertion of the UNBLANK signal 770 and the UNSOL signal 770, the current limit is set about 20% higher (for the example embodiment) than the normal current limit to test for a super-overload condition during that initial portion of the time period of the on state for the main switch M0.

After the UNSOL signal 770 goes high, normal current limiting operates and R-S flip-flop I10 will not be able to be set again until a subsequent clock cycle when a super-overload condition can be tested again. In other words, if an over current condition is detected after the UNSOL signal 770 goes high, it is a normal over current condition, which just turns off the main switch M0 early via NAND gate I55 and NOR gate I29, but does not set the R-S flip-flop I10 to indicate a super-overload condition on SOLQ. If, an over current condition is detected before the UNSOL signal 770 goes high, it indicates a super overload condition and the R-S flip-flop I10 is set, which asserts the SOLQ signal to shut off the main switch M0 and begin a soft start via assertion of the ARMSS signal 760.

Once the SOLQ signal is asserted (i.e., the R-S flip-flop I10 is set) the main switch is turned off and cannot be restarted until the R-S flop I10 is reset. A reset of the R-S flip-flop I10 requires several things to happen, the first of which is that the inductor current in the main inductor I0 (FIG. 3) must fall to a predetermined level (e.g., at or near zero). While the inductor current flows in the free wheeling diode (D1 on FIG. 3), the DON signal 580 will be high, blocking the reset path through NOR gate I40 to the R-S flip-flop I10. When the DON signal 580 goes low, it indicates that the inductor current has fallen to the predetermined level. In addition, the LSQ signal 790 must be low (in case the switch is still on while signals are propagating), there must not be an over current signal (i.e., the output of NOR gate I41), and the clock signal must have switched Qbar of D flip-flop I27.

When all these things happen, the output of NOR gate I40 will go high, the R-S flip-flop I10 will be reset, the ARMSS signal 760 will go low, and the soft start state will be initiated.

The UNBLANK signal 780 may also used to reset the toggle flop I10 in preparation for the next cycle.

The first input of NOR gate I50 is discussed above. A second input is connected to the LSQ signal 790 (i.e., the output of NOR gate I29) in a regenerative fashion, to act as a flip-flop and store the on-state of the main switch M0 until it is cleared by a signal on one of the other inputs to NOR gate I29.

Under normal conditions, with no over load indication from the ICOMP signal 690, the LSQ signal 790 (i.e., the output of NOR gate 790) is initially asserted from the clock pulse generated at the rising edge of the clock signal 710. Then, it is held asserted as long as the PWMCOMP signal 455 from the comparator 450 (FIG. 4) is low, indicating that the RAMP signal 680 (FIG. 4) is still lower than the CN signal 890 (FIG. 4). When the RAMP signal exceed the CN signal 890, the PWMCOMP signal 455 goes high and the LSQ signal 790 goes low to turn off the main switch M0.

Finally, the EN signal 440, connects to a second input of NAND gate I39 allowing it to work as an inverter when the EN signal 440 is high, and forcing the R-S flip-flop I10 set when EN is low. A low on the EN signal 440 arms soft start and permits the start when the EN signal 440 next goes high. R-S flip-flop I10 prevents the main switch M0 from coming on until the EN signal 440 is high and the conditions controlling NOR gate I40 permit it to reset S-R flip-flop I10.

In a conventional switching power converter, for example a buck or a boost converter, there is often a need to provide both frequency compensation, for normal closed loop stable operation, and also to provide a soft start function. Each of these functions conventionally may be implemented using a different capacitor for each function. Loop stabilizing frequency compensation is often conventionally shaped by loading an Operational Transconductance Amplifier (OTA) with a selected driving point impedance. Frequently, this compensation is done with a single series RC network as the driving point impedance. In addition, soft start functions are often included in a switching power converter. Many conventional implementations include a switch to preset the voltage to result in the minimum duty ratio. The voltage is then made to rise slowly so as to cause the duty ratio to change slowly and gradually bring the converter output to the normal controlled level.

Embodiments of the present invention utilize a single capacitor to perform both functions, which may reduce complexity and save die area. Embodiments of the present invention set a bias current to an OTA bias to a very low level when startup begins. This low bias current is reflected in the OTA since the limited current also limits the slew rate that can be realized at the OTA output, or compensation node.

As the slew limited compensation voltage approaches a value necessary to cause the converter to reach its set point voltage, the OTA will begin to come out of the slewing behavior. This approach to the desired value is simply detected within the amplifier and signals the bias circuit to restore the normal, higher, level of OTA bias, and normal operation follows.

FIG. 8 illustrates a circuit diagram of an error amplifier, soft start control, and supporting circuitry according to one or more embodiments of the present invention. The error amplifier block 800 combines an internal OTA 840 with self contained frequency compensation and a soft start function.

In conventional soft start circuits, either the frequency compensation, the soft start control, or both may be controlled with separate capacitors that are external to an integrated DC-DC controller 400 (FIG. 4). Moreover, if separate capacitors are needed for each of the soft start and frequency compensation functions, it may be difficult to incorporate the separate capacitors on an integrated circuit. However, in embodiments of the present invention, a single capacitor may be used for both frequency compensation and soft start control. A single capacitor is much easier to integrate on a monolithic integrated circuit and consumes much less space on the integrated circuit relative to two or more separate capacitors.

The OTA 840 includes a biased differential pair of transistors (M0 and M2) with inputs PIN 810 and NIN 812. Transistor M0 drives mirror transistors M1 and M6 and transistor M2 drives mirror transistors M7 and M8. The inverted polarity current from transistor M0 is delivered to the CN signal 890 by transistor M6, while the inverted polarity current of transistor M2 is mirrored onto transistor M8 and is inverted once again by a mirror of cascoded transistors M5 and M23 mirrored onto cascoded transistor M24, and M3, which delivers the result to the CN signal 890.

The CN signal 890 also connects to resistor R1 and capacitor C1, which are the frequency compensation components that induce a pole followed by a zero in the loop gain, as frequency increases.

The error amplifier 800 includes two parallel bias arrangements for the OTA 840. An operational bias circuit 850 may be active during normal operation and a soft start bias circuit 860 may be active during soft start operations. Both bias circuits provide tail current to the OTA 840 through node 845 (also referred to herein as a common bias node) and in some cases, such as, for example, normal operation, both bias circuits may supply current to node 845.

For normal operation, the operational bias circuit 850 provides the bias current to the common sources of transistors M0 and M2 by transistor M26. The normal bias circuit 850 is split into two components, which are individually mirrored back to the bias circuit by transistor M9 and transistor M10. These two transistors reflect the current components delivered to transistor M1 and transistor M7 when enable transistor M12 is on to connect the sources of transistors M9 and M10 to ground.

Together, these two currents are delivered to transistor M11 by way of diode-connected transistor M25. Transistors M25 and M26 are configured to make the drain voltages of transistors M11 and M13 about the same even though the current through transistor M13 is delivered to node 845, which may be at a potentially low voltage. Thus, transistors M10 and M9 combine to generate a current on a combining node 824 that is very close to or the same as the current biasing the differential pair transistors (M0 and M2) by transistor M26. This current through transistor M26 is produced by transistor M13, driven by the gate voltage of diode connected transistor M11, through resistor R4 via bypass transistor M32 or through series connected resistors R4 and R2. In one embodiment, transistor M13 may be larger (e.g., 4×) than transistor M11. Thus, a significant voltage is developed across the selected resistor combination, setting the bias current for the differential pair transistors (M0 and M2) at node 845. When the currents through transistors M11 and M13 are equal, this current for the normal bias circuit 850 controls the bias current so that it sets the transconductance (Gm) of the differential pair transistors (M0 and M2) to be proportional to the reciprocal of the active resistor value almost independently of manufacturing variations in the devices and of temperature. The stack of transistors M11, M25, M10 and M9 may be referred to herein as a current summing stack. The stack of resistors R4 and R2 and transistors M13 and M26 may be referred to herein as a mirror stack.

The value of the Gm-setting resistance can be changed by switching transistor M32 (also referred to herein as a resistor bypass switch) on or off by way of Gm select signal 852. Since the Gm acts on resistor R1 to set the compensated value of gain for the OTA 840, the high frequency gain can be adjusted to compensate for differences in attenuation in the overall loop feedback. Thus, one Gm setting may be selected to correspond to a higher desired output voltage Vout 320 (FIG. 3) for the switching converter 300 (FIG. 3) and another Gm setting may be selected to correspond to a lower desired output voltage. In this way, a single feedback attenuation circuit (e.g., resistor R3 and resistor R4 of FIG. 4), external to the integrated circuit with the OTA may be used to cover a wide range of voltages for Vout 320. Of course, while not specifically shown, additional series resistors and bypass transistors configured similar to transistor M32 and resistor R2 may be included to add more granularity and range for Gm selection relative to desired output voltage.

The forced balance arrangement in the normal bias circuit 850 depends on transistor M12 switching the sources of transistors M9 and M10 to ground. Transistor M12 is normally driven on by a high output on R-S flip-flop I5. However, R-S flip-flop I5 can be reset from the ARMSS signal 760. When R-S flip-flop I5 is reset, it turns off transistor M12 and disables the controlled Gm bias circuit 850 such that substantially no current is delivered to the OTA 840 via node 845.

In this reset case, the soft start bias circuit 860 comes into play. In one embodiment, a current of about 10 uA from a BIAS signal 862 is diverted to ground through transistor M14 and transistor M29. The gate input of transistor M29 is connected to the PIN signal 810, which may be set at a voltage reference for the OTA 840. As a result, this current of about 10 uA through transistor M14 and M29 will be relatively constant as long as the voltage relationship between PIN and the BIAS voltage 862 remains relatively constant. The four series and diode connected transistors M15, M16, M17, and M18 create an equivalent of a transistor with a very long channel length, which will conduct a small amount of current (e.g., ~50 nA) to the common sources of the differential pair transistors (M0 and M2) via node 845. If the output voltage Vout 320 (FIG. 3) is less than enough to balance the feedback voltage Vfb 420 with the voltage reference applied to the input PIN 810, most of this current will flow through M2 and its two inversions, to be delivered to OUT, and the comparator 460 (FIG. 4).

The ARMSS signal 760 also turns on transistor M21 (also referred to herein as a capacitor bypass switch), which shorts the frequency compensation capacitor C1, voltage to ground and continues to sink the small bias current. When the ARMSS signal 760 goes low, R-S flip-flop I5 continues to hold off transistor M12, but capacitor C1 is released to be charged by the small bias flowing from the soft start bias circuit 860. The voltage on the CN signal 890 begins to rise as a result. This voltage will be used to set the duty ratio of the main switch M0 (FIG. 5), and when the CN signal 890 is low relative to the RAMP signal 680 (FIG. 4) the duty ratio of the main switch M0 will also be low, causing a low output from the switching power converter 300 (FIG. 4). During the time that the soft start bias circuit 860 is supplying current, but the operational bias circuit 850 is not, the duty ratio is permitted to rise slowly as the small bias current from the soft start bias circuit 860 charges capacitor C1. Eventually, and depending on the loading and voltage setting for the switching power converter 300, the CN signal 890 will rise to permit the duty ratio to increase to the value required to maintain the output switching power converter 300 at the voltage set by the feedback divider and input on the Vfb signal 420 (FIG. 4). When this point near equilibrium is reached, the differential pair transistors (M0 and M2) come near a balance point and the input voltages of the two mirror transistors M1 and M7 will become approximately equal.

A sense amplifier 870 may be used to sense when the input voltages (820 and 822) of the two mirror transistors M1 and M7 will become approximately equal. The sense amplifier includes sense transistor M20 and M19 coupled to monitor the drains of transistors M1 and M7, respectively on the OTA 840. Mirror transistors M27 and M28 provide the pull up and feedback for driving the set signal to the R-S flip-flop I5 high.

During ramp up in the soft start state, the set input to R-S flip-flop I5, which is driven from the sense amplifier 870, will be low. As the input voltages (820 and 822) approach each other, the sense amplifier 870 will flip and R-S flip-flop I5 will be set, which turns on transistor M12 and the operational bias circuit 850 takes over.

Circuits such as the operational bias circuit 850 can have start up problems when transistor M12 is initially turned on. However, the small bias current from the soft start bias circuit 860 is enough to start the slightly positive feedback loop in the operational bias circuit 850, enabling the operational bias circuit 850 to quickly ramp up and stabilize at the desired controlled Gm operating point and keep the transconductance of differential pair transistors (M0 and M2) at a desired constant level.

Figure 9A:
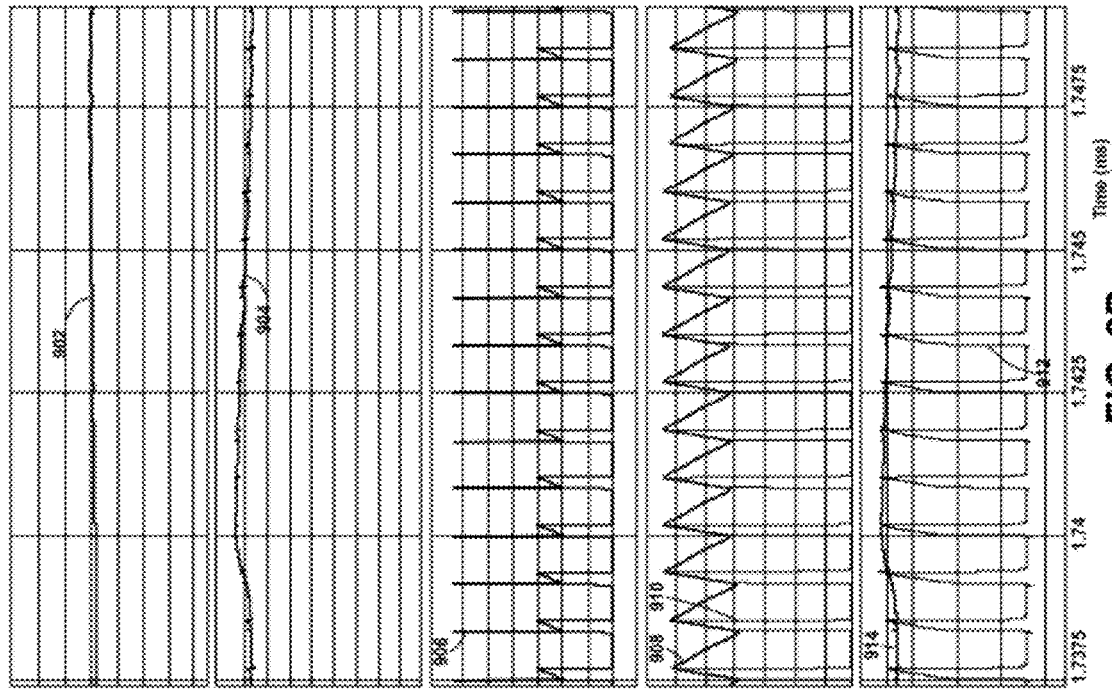
FIGS. 9A and 9B show timing diagrams of waveforms for various signals of the switching power converter 300 of FIG. 3 illustrating parameters of a soft-start operation.
Figure 9B:
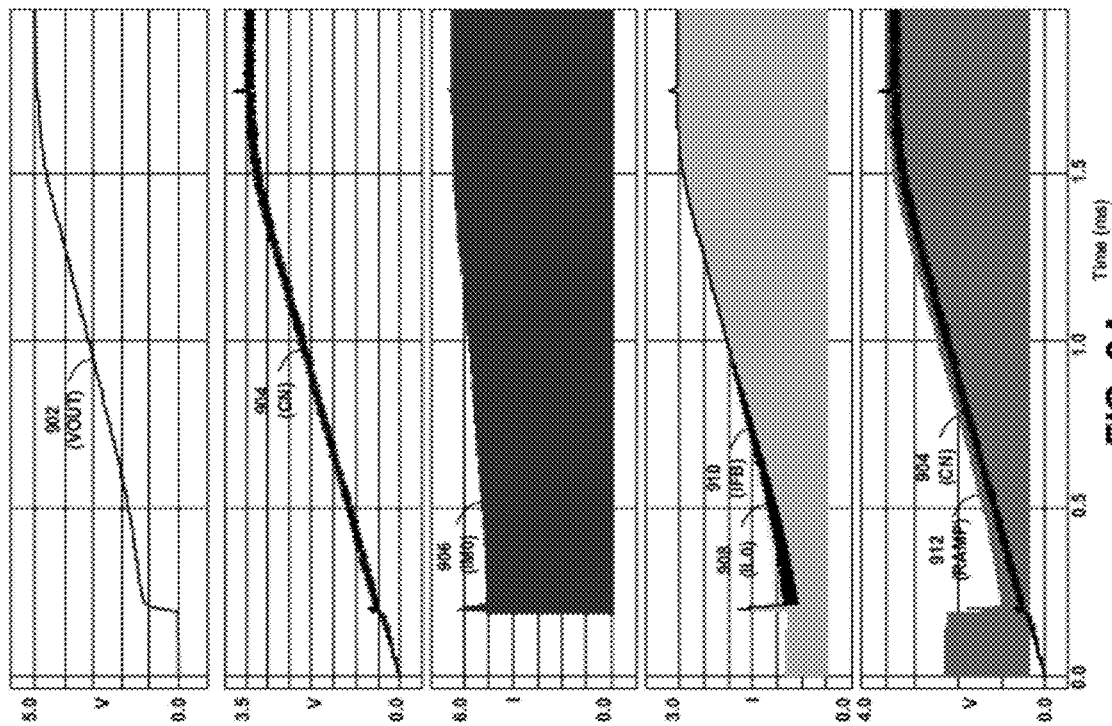

FIGS. 9A and 9B show timing diagrams of waveforms for various signals of the switching power converter 300 of FIG. 3 illustrating of a soft-start operation. As a non-limiting example, FIGS. 9A and 9B show a soft start into 2 Ohms for a load of 2.5 A at 5V out. FIG. 9A shows a relatively long time period of about 2 milliseconds and FIG. 9B shows a small time period of the FIG. 9A waveforms between about 1.7375 milliseconds and about 1.75 milliseconds.

The top diagrams illustrate a voltage 902 on the Vout signal 320 (FIG. 3) as the final output of the switching power supply 300. As can be seen on the left diagram, the voltage 902 gradually rises linearly as the soft-start process proceeds until it stabilizes at about 5 volts near the end of the soft-start process.

The second from the top diagrams illustrate a voltage 904 on the CN signal 890, which is the output from the error amplifier. As can be seen on the left diagram, the voltage 904 gradually rises linearly as the soft-start process proceeds until it stabilizes at about 3.5 volts near the end of the soft-start process. Also on the left diagram, a spike can be seen at about 1.75 milliseconds. This spike results from the switchover from soft start to normal operation. In other words, and looking at FIG. 8, from when the soft start bias circuit 860 is supplying current to the OTA 840 to when the operational bias circuit 850 is supplying current to the OTA 840. Examining the right diagram, the spike appears as a bump in voltage 904 between about 1.74 and 1.745 milliseconds. However, there is little change in the output voltage 902.

The third from the top diagrams illustrate a current 906 through the main switch M0. As can be seen on the right diagram, the amplitude is dominated by a turn on transient spike as the switch charges capacitance at SWN. This is the transient that is suppressed by the UNBLANK signal 780 (FIG. 7).

The fourth from the top diagrams illustrate a current 910 of the IFB signal 590 (FIG. 5), which is the replica current. As can be seen on the right diagram, the current 910 follows the current 906 but without the transient spike. Also illustrated in these diagrams is a current 908 through the main inductor L0 (FIG. 3). As can be seen on the right diagram, the replica current 910 tracks very closely with the main inductor current 908, during the rise time of the currents.

The bottom diagrams illustrate a voltage 912 on the RAMP signal 680 (FIG. 6). The voltage 904 on the CN (i.e., compensation node) signal 890, which is the output from the error amplifier, is superimposed on the bottom diagrams. The left diagram illustrates the RAMP voltage 912 starting offset and that the compensation node voltage 904 can be much lower. Before the compensation node voltage 904 rises to the RAMP voltage 912, the ramp is reset and run with each clock, but not turned off by the switch control, since as you see in other traces (e.g., current 906), the switch stays off until the compensation node can control.

Figure 10A:
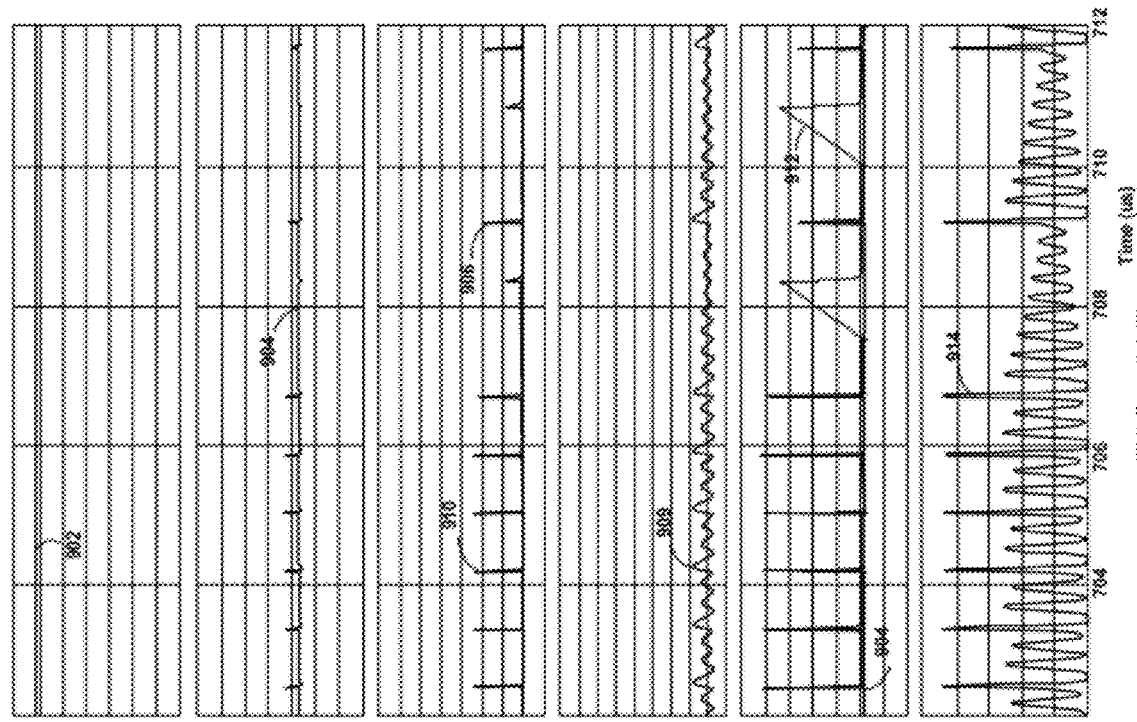
FIGS. 10A and 10B show timing diagrams of waveforms for various signals of the switching power converter 300 of FIG. 3 illustrating parameters of a light load performance.
Figure 10B:
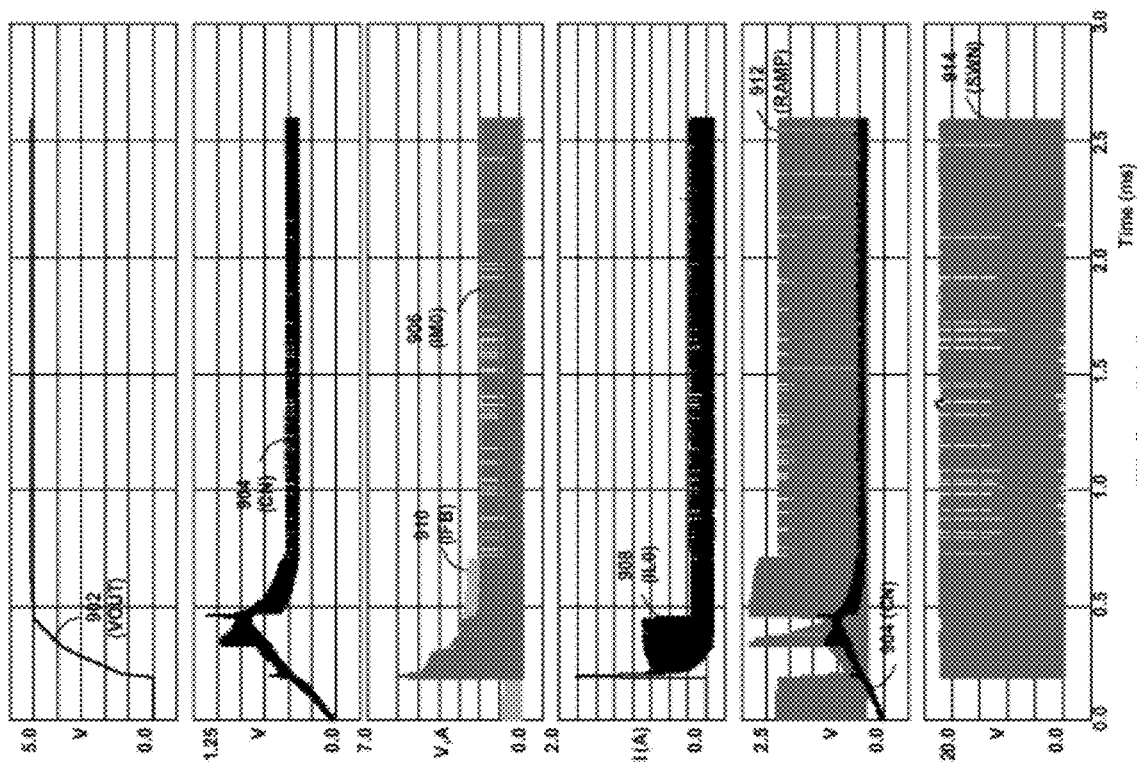

FIGS. 10A and 10B show timing diagrams of waveforms for various signals of the switching power converter 300 of FIG. 3 illustrating parameters of a light load performance. As a non-limiting example, FIGS. 10A and 10B show the switching power converter running with a 5K load resulting in a 1 mA current, which is not a recommended operating condition.

FIG. 10A shows a relatively long time period of about 3 milliseconds and FIG. 10B shows a small time period of the FIG. 10A waveforms between about 702 microseconds and about 712 microseconds.

The top diagrams illustrate a voltage 902 on the Vout signal 320 (FIG. 3) as the final output of the switching power supply 300. The second from the top diagrams illustrate a voltage 904 on the CN signal 890, which is the output from the error amplifier. The third from the top diagrams illustrate a current 910 of the IFB signal 590 and a current 906 through the main switch M0. The fourth from the top diagrams illustrate current 908 through the main inductor L0 (FIG. 3). The fifth from the top diagrams illustrate voltage 912 on the RAMP signal 680 (FIG. 6) and a voltage 904 on the CN (i.e., compensation node) signal 890. The bottom diagrams illustrate a voltage 914 on the SWN signal 490 (FIG. 4).

As can be seen from the diagrams, the Vout voltage 902 ramps up limited by the low bias compensation node voltage 904. Since this rise is relatively slow, the compensation node voltage 904 overshoot is relatively small, although the time to settle back is quite long. The lower right trace for the SWN voltage 914 illustrates ringing in the main inductor L0 the inductor ringing as the circuit goes into DCCM, and then begins to skip clock trigger cycles.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A soft start circuit for a switching power converter, comprising:
    an amplifier configured to operate from a common bias node and amplify a difference between a non-inverting input signal and an inverting input signal to generate an amplifier output;
    a soft start bias circuit operably coupled to the common bias node and configured to supply a soft start bias current during a soft start process for the switching power converter;
    an operational bias circuit operably coupled to the common bias node and configured to supply an operational bias current after the soft start process; and
    a capacitor operably coupled to the amplifier output and configured to provide both a frequency compensation for the switching power converter and a charging ramp for the soft start process.

2. The soft start circuit of claim 1, wherein the amplifier comprises an operational transconductance amplifier (OTA) and wherein the operational bias circuit further comprises:
    a current summing stack comprising:
        a first transistor with a gate operably coupled to the inverting input signal;
        a second transistor with a gate operably coupled to the non-inverting input signal; and a current source stack operably coupled between a power source and a combining node coupled to a drain of the first transistor and a drain of the second transistor; and a mirror stack configured to mirror a current in the current source stack to a proportional current in the common bias node, wherein the mirror stack includes a series resistance such that a transconductance of the OTA is proportional to a reciprocal of the series resistance.

3. The soft start circuit of claim 2, wherein the series resistance comprises at least two resistors in series and further comprising a resistor bypass switch operably coupled in parallel with one of the at least two resistors.

4. The soft start circuit of claim 2, wherein the amplifier, the soft start bias circuit, the operational bias circuit, and the capacitor are on a monolithic integrated circuit.

5. The soft start circuit of claim 1, wherein the capacitor is operably coupled in series between a ground and a series resistor connected between the capacitor and the amplifier output.

6. The soft start circuit of claim 5, further comprising a capacitor bypass switch operably coupled in parallel with the capacitor and configured to discharge the capacitor at an initiation of the soft start process.

7. The soft start circuit of claim 1, wherein the amplifier comprises an OTA including:
a negative input transistor with a gate operably coupled to the inverting input signal, a source operably coupled to the common bias node and a drain operably coupled to a mirrored current source; and
a positive input transistor with a gate operably coupled to the non-inverting input signal, a source operably coupled to the common bias node, and a drain coupled to another mirrored current source;
wherein the soft start circuit further comprises a sense amplifier with one input operably coupled to a drain of the negative input transistor and another input operably coupled to a drain of the positive input transistor, the sense amplifier configured to terminate the soft start process when the non-inverting input signal and the inverting input signal approach an equilibrium.

8. The soft start circuit of claim 1, wherein the soft start bias current is at least an order of magnitude smaller than the operational bias current and substantially limits a current the amplifier can produce on the amplifier output during the soft start process.

9. A soft start circuit for a switching power converter, comprising:
an amplifier configured to operate from a common bias node and amplify a difference between a non-inverting input signal and an inverting input signal to generate an amplifier output;
a soft start bias circuit operably coupled to the common bias node and configured to supply a soft start bias current during a soft start process for the switching power converter; and
an operational bias circuit operably coupled to the common bias node and configured to supply an operational bias current after the soft start process;
wherein the soft start bias current is at least an order of magnitude smaller than the operational bias current and substantially limits a current that the amplifier can produce on the amplifier output during the soft start process.

10. The soft start circuit of claim 9, further comprising a capacitor operably coupled to the amplifier output and configured to provide a frequency compensation for the switching power converter and a charging ramp for the soft start process.

11. The soft start circuit of claim 10, further comprising a capacitor bypass switch operably coupled in parallel with the capacitor and configured to discharge the capacitor at an initiation of the soft start process.

12. The soft start circuit of claim 11, wherein the amplifier, the soft start bias circuit, the operational bias circuit, the capacitor, and the capacitor bypass switch are on a monolithic integrated circuit.

13. The soft start circuit of claim 9, wherein the amplifier comprises an operational transconductance amplifier (OTA) and wherein the operational bias circuit further comprises:
a current summing stack comprising:
a first transistor with a gate operably coupled to the inverting input signal;
a second transistor with a gate operably coupled to the non-inverting input signal; and
a current source stack operably coupled between a power source and a combining node coupled to a drain of the first transistor and a drain of the second transistor; and
a mirror stack configured to mirror a current in the current source stack to a proportional current in the common bias node, wherein the mirror stack includes a series resistance such that a transconductance of the OTA is proportional to a reciprocal of the series resistance.

14. The soft start circuit of claim 13, wherein the series resistance comprises at least two discrete resistors in series and further comprising a resistor bypass switch operably coupled in parallel with one of the at least two discrete transistors.

15. A method of operating a switching power converter, comprising:
producing a soft start bias current for a common bias node during a soft start process;
producing an operational bias current for the common bias node after the soft start process;
combining the soft start bias current and the operational bias current on the common bias node;
supplying a combined bias current from the common bias node to an amplifier to amplify a difference between a non-inverting input signal and an inverting input signal on an amplifier output;
charging a capacitor with the amplifier output during the soft start process; and
providing frequency compensation for the switching power converter with the capacitor after the soft start process.

16. The method of claim 15, wherein supplying the combined bias current from the common bias node to the amplifier supplies the combined bias current to an OTA and wherein the producing the operational bias current further comprises:
summing current through a first transistor with a gate operably coupled to the inverting input signal and current through a second transistor with a gate operably coupled to the non-inverting input signal; and
mirroring the summed current to a mirror stack operably coupled between a series resistance and the common bias node such that a transconductance of the OTA is proportional to a reciprocal of the series resistance.

17. The method of claim 16, wherein mirroring the summed current further comprises bypassing a portion of the series resistance to adjust the transconductance of the OTA.

18. The method of claim 15, wherein the soft start bias current is at least an order of magnitude smaller than the operational bias current and substantially limits a current that the amplifier can produce on the amplifier output during the soft start process.

19. The method of claim 15, further comprising:
   detecting when the non-inverting input signal and the inverting input signal approach an equilibrium; and
   terminating the soft start process responsive to the detecting.

20. The method of claim 15, further comprising bypassing the capacitor to remove a charge thereon and begin a new soft start process.

21. A method of operating a switching power converter, comprising:
   producing a soft start bias current for a common bias node during a soft start process;
   producing an operational bias current for the common bias node after the soft start process;
   combining the soft start bias current and the operational bias current on the common bias node; and
   supplying a combined bias current from the common bias node to an amplifier to amplify a difference between a non-inverting input signal and an inverting input signal on an amplifier output;
   wherein the soft start bias current is at least an order of magnitude smaller than the operational bias current and substantially limits a current that the amplifier can produce on the amplifier output during the soft start process.

22. The method of claim 21, further comprising:
   charging a capacitor with the amplifier output during the soft start process; and
   providing frequency compensation for the switching power converter with the capacitor after the soft start process.

23. The method of claim 21, wherein supplying the combined bias current from the common bias node to the amplifier supplies the combined bias current to an OTA and wherein the producing the operational bias current further comprises:
   summing current through a first transistor with a gate operably coupled to the inverting input signal and current through a second transistor with a gate operably coupled to the non-inverting input signal; and
   mirroring the summed current to a mirror stack operably coupled between a series resistance and the common bias node such that a transconductance of the OTA is proportional to a reciprocal of the series resistance.

24. The method of claim 23, wherein mirroring the summed current further comprises bypassing a portion of the series resistance to adjust the transconductance of the OTA.

25. The method of claim 21, further comprising:
   detecting when the non-inverting input signal and the inverting input signal approach an equilibrium; and
   terminating the soft start process responsive to the detecting.

* * * * *